Oct. 3, 1950   J. ALBERTOLI   2,524,248
FRUIT GUIDING APPARATUS
Filed Nov. 7, 1947
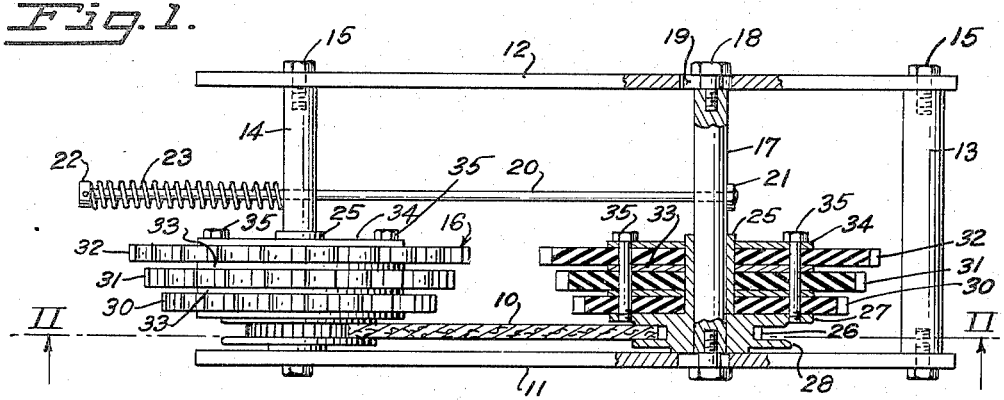
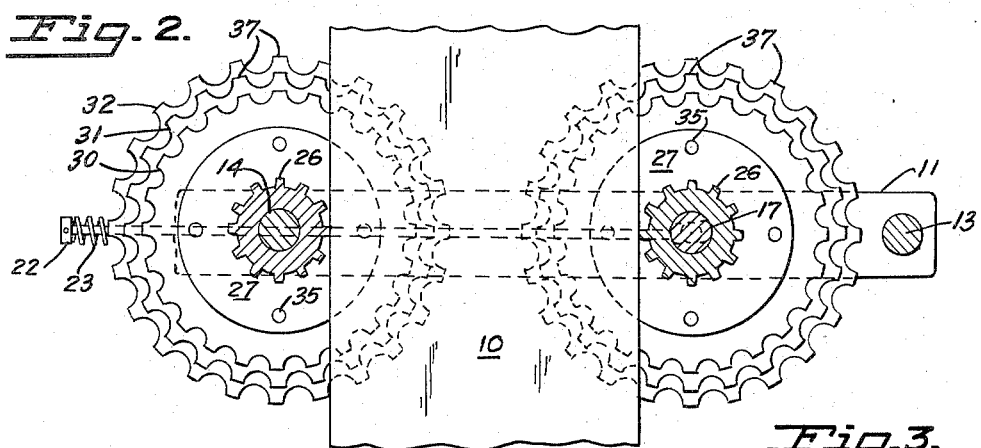
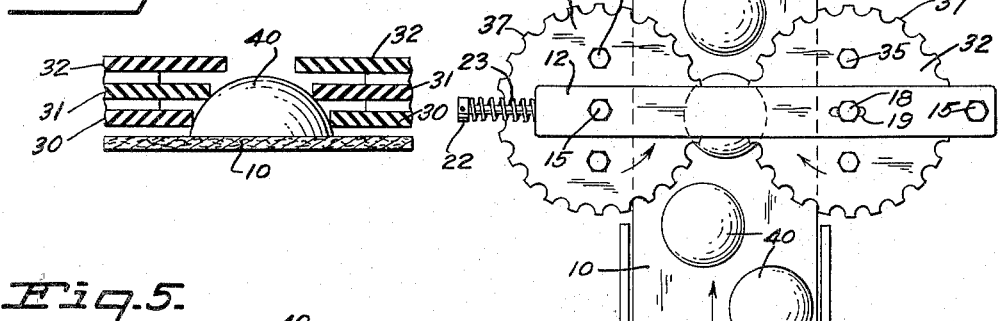
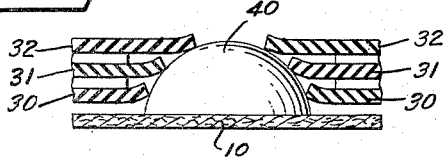
INVENTOR.
JOHN ALBERTOLI
BY
Charles M. Fryer
ATTORNEY Patented Oct. 3, 1950

2,524,248

UNITED STATES PATENT OFFICE 2,524,248

FRUIT GUIDING APPARATUS

John Albertoli, San Francisco, Calif.

Application November 7, 1947, Serial No. 784,580

7 Claims. (Cl. 198—30)

The present invention relates to canning or processing machinery and particularly to apparatus for aligning fruit or vegetable parts such as halves as they are conveyed by a belt, for example, from a sorting or processing table or machine to another processing station.

Various uses to which the apparatus of the present invention may be put will be obvious from an understanding of the invention gained from the following description. For the purpose of illustrating the invention, however, it is shown and described herein as applied to arranging and guiding peach halves as they are carried by a belt from a sorting table to a set of slicing knives by means of which they are sliced preparatory to canning.

An object of the invention is to provide apparatus for intercepting pieces of fruit or the like arranged at random on a conveyor belt and to align said pieces centrally on the belt and space them in a manner to cause them to be fed directly and in properly spaced order to a cutting or processing device fed by the belt. Further and more specific objects and advantages of the invention are made apparent in the following specification wherein a detailed description of a preferred apparatus embodying the invention is made by reference to the accompanying drawings.

In the drawings:

Fig. 1 is a front elevation, with parts illustrated in section, of a fruit guiding apparatus embodying the present invention;

Fig. 2 is a sectional view looking upwardly as from the line II—II of Fig. 1;

Fig. 3 is a plan view of the apparatus on reduced scale showing the arrangement of fruit halves before and after they have passed the apparatus;

Fig. 4 is a diagrammatic view in section showing a small fruit half passing through the apparatus; and Fig. 5 is a view like Fig. 4 illustrating a larger fruit half passing through the apparatus.

A flexible conveyor belt for conveying fruit halves from one processing station to another is shown at 10 in the drawings. This belt may be considered as leading between a processing table where fruit is sorted and deposited onto the belt in halves with the flat side down and a set of knives arranged to intercept and slice the halves. Neither the processing table nor the knives are shown in the drawings as these parts may be of any conventional form, as may also be the means by which the belt 10 is driven.

It is desirable that the fruit halves on the belt approach the slicing knives in a direct line so that each half will be properly and uniformly sliced by the knives. It is also desirable that the halves of fruit on the belt do not crowd each other but rather that they be spaced slightly from each other as they approach the knives so that they will pass through the knives in a uniform orderly fashion one at a time. In order to accomplish the alignment of the fruit placed at random on the belt, and also to insure that the pieces or halves are spaced from each other, the present invention provides the apparatus best illustrated in Figs. 1 and 2, which comprises a base plate 11 underlying the belt 10 and a top plate 12 overlying the belt. The plates 11 and 12 are spaced apart by spacing posts 13 and 14 secured in position as by cap screws 15 passing through the plates and entering the ends of the posts. The whole frame comprising the plates 11 and 12 and posts 13 and 14 may be supported by any suitable bracket means (not shown) in a stationary position relative to the belt. A pair of rotary guiding and advancing members, generally indicated at 16, are supported between the plates 11 and 12, one being rotatably mounted on the post 14 and the other being similarly mounted on an adjustable post 17. The adjustable post 17 is similar in construction and position to the posts 13 and 14 but is held in place by shouldered cap screws 18 which pass through elongated slots 19 in the plates 11 and 12 to permit the post 17 to slide toward and away from the post 14. A rod 20 passes through both of the posts 14 and 17 and has an abutment nut 21 on one of its ends engageable with the post 17. At its opposite end an adjustable abutment collar 22 serves to engage a spring 23 interposed between this collar and the post 14. As the spring 23 is under compression it tends to urge the post 17 toward the post 14.

The rotary guiding and advancing members 16 each comprise a hollow spindle 25 rotatably mounted on the posts 14 and 17. On the lower end of the spindle a gear 26 is carried between flanges 27 and 28. The gears 26 need not be true gears in form so long as their peripheral edges engage the belt. It may be preferable, however, that their belt-engaging edges be serrated or otherwise irregularly formed to provide a frictional or gripping contact with the opposite edges of the belt 10 so that upon movement of the belt the gears and spindles 25 carried with them are caused to rotate.

Supported above the gear flanges 27 is a plurality of vertically spaced fruit engaging discs 30, 31 and 32. These discs are made of soft rubber or other highly resilient material and are graduated in size, the larger discs being disposed upwardly or farthest from the belt so that the space between the two sets of discs converges upwardly and conforms approximately to the semispherical shape of a fruit half being conveyed on the belt 10. The several discs 30, 31 and 32 are preferably slightly spaced by washers 33 of metal, rubber or any suitable material and a top plate 34 is provided to overlie the topmost disc 32. Screws 35 extend through the top plate, all of the discs and all of the spacing washers 33 and enter the top flange 27 of the gear 26 to retain the discs together as a unit adapted to be driven in a rotary manner by rotation of the gear 26. As the gear 26 is of relatively small diameter, the peripheral speed of the resilient discs 30, 31 and 32 will be in excess of the speed of the belt by which they are driven.

The edges of all the resilient discs 30, 31 and 32 are preferably notched to form serrations or irregularities, as shown at 37 in Fig. 2. This enables the discs to engage the fruit halves on the belt 10 with a gripping or frictional action. Because of the circular or disc-like shape of the outer edges of the fruit-guiding members 16, their adjacent edges which overlie the belt 10 converge toward each other so that with the belt moving in the direction indicated by the arrow in Fig. 3 fruit halves, indicated at 40 as being carried by the belt, and disposed thereon at random as they approach the guiding members, will upon entering between the facing edges of the guiding members be directed and confined to the center of the belt. As the peripheral speed of the guiding members is greater than that of the belt, the fruit halves will not only be aligned centrally of the belt but will be spaced apart as they leave the guiding members to insure against their piling up or jamming as they approach the cutting knives or other processing apparatus to which they are being delivered.

The softness or flexibility of the discs 30, 31 and 32 protects the fruit halves against bruising and also permits their accommodation and engagement with pieces of fruit of different sizes. The latter is diagrammatically illustrated in Figs. 4 and 5 of the drawings. In Fig. 4 the fruit half 40 carried on the belt is shown as passing between the guiding and advancing member 16 and in this illustration the fruit half is of a small size barely engaged by the outer edges of the discs 30, 31 and 32. In Fig. 5 a larger fruit half 40 is illustrated as passing between the member 16 and to accommodate the greater size of the fruit half the outer edges of the resilient discs are flexed upwardly.

The apparatus herein disclosed has proven highly efficient in aligning fruit halves on a conveyor belt and in spacing the halves to prevent their piling up or crowding each other as they approach cutting knives or the like. The apparatus also has the advantage that it is extremely simple in construction and operation and that it is driven entirely by its contact with the moving belt. The tension of the spring 23 which maintains this contact may be regulated to apply just a sufficient friction to insure rotation of the guiding and advancing members through frictional engagement of the belt edges with the gear-like members 26.

I claim:

1. Apparatus for positioning fruit parts on a conveyor belt comprising rotatable members overlying the belt for engagement from opposite sides with the fruit parts, and means on said rotatable members engaging the edges of the belt as it moves to impart rotation to them.

2. Apparatus for positioning fruit parts on a conveyor belt comprising rotatable members overlying the belt for engagement from opposite sides with the fruit parts, and means on said rotatable members engaging the edges of the belt as it moves to impart rotation to them at a peripheral speed exceeding the lineal speed of the belt.

3. Apparatus for effecting orderly arrangement of fruit parts on a moving conveyor belt comprising a pair of shafts adjacent opposite edges of the belt, a rotary member on each shaft to overlie the belt edge and produce a confining passage for the fruit parts, each rotary member including a set of spaced superposed resilient discs graduated in size.

4. Apparatus for effecting orderly arrangement of fruit parts on a moving conveyor belt comprising a pair of shafts adjacent opposite edges of the belt, a rotary member on each shaft to overlie the belt edge and produce a confining passage for the fruit parts, each rotary member including a set of spaced superposed resilient discs graduated in size and having serrated peripheral edges.

5. Apparatus for effecting orderly arrangement of fruit parts on a moving conveyor belt comprising a pair of shafts adjacent opposite edges of the belt, a rotary member on each shaft to overlie the belt edge and produce a confining passage for the fruit parts, a gear-like member on each rotary member for engagement with the opposite edges of the belt, and resilient means associated with the shafts to insure driving contact between the belt edges and the gear-like members.

6. Apparatus for positioning fruit parts on a conveyor belt which comprises two rotors disposed on opposite sides of the belt and a plurality of spaced resilient discs on each rotor, said discs being graduated toward larger sizes as they progress away from the fruit supporting surface of the belt.

7. Apparatus for positioning fruit parts on a conveyor belt which comprises two rotors disposed on opposite sides of the belt and a plurality of spaced resilient discs on each rotor, said discs being graduated toward larger sizes as they progress away from the fruit supporting surface of the belt and serrated edges on said discs.

JOHN ALBERTOLI.

REFERENCES CITED

The following references are of record in the file of this patent:

UNITED STATES PATENTS

| Number | Name | Date |
|---|---|---|
| 1,667,956 | Smith | May 1, 1928 |
| 1,784,010 | Johnson | Dec. 9, 1930 |
| 1,810,619 | Oslund | June 16, 1931 |
| 2,404,232 | Hunter | July 16, 1946 |